United States Patent
Gonzalez Moral et al.

(10) Patent No.: US 8,124,227 B2
(45) Date of Patent: Feb. 28, 2012

(54) CARBON NANOFIBERS AND PROCEDURE FOR OBTAINING SAID NANOFIBERS

(75) Inventors: José Luis Gonzalez Moral, Salamanca (ES); José Vera Agulló, Eiche (ES); César Merino Sánchez, Buniel (ES); Ignacio Martín Gullón, Alicante (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 897 days.

(21) Appl. No.: 12/117,995

(22) Filed: May 9, 2008

(65) Prior Publication Data

US 2009/0035569 A1 Feb. 5, 2009

(30) Foreign Application Priority Data

May 11, 2007 (EP) .................................. 07009540

(51) Int. Cl.
*B32B 19/00* (2006.01)
*D02G 3/00* (2006.01)

(52) U.S. Cl. ........ 428/364; 428/357; 428/376; 428/397; 428/398; 428/401; 977/734; 977/735; 977/762; 977/765

(58) Field of Classification Search .................. 428/357, 428/364, 376, 397, 398, 401; 977/734, 735, 977/762, 765; 423/445 R, 447.1, 447.3
See application file for complete search history.

(56) References Cited

U.S. PATENT DOCUMENTS

2005/0163697 A1* 7/2005 Beguin et al. .............. 423/447.6

OTHER PUBLICATIONS

Martin-Gullon et al., Differences between carbon nanofibers produced using Fe and Ni catalysts in a floating catalyst reactor, Carbon 44 (2006) 1572-1580. Available online Feb. 20, 2006.*
Three Google Searches each dated Oct. 18, 2011.*
ISO 9277: 1995; "Determination of the specific surface area of solids by gas adsorption using the BET method"; English translation of DIN 66131 : 1993; 11 pages.
ISO 9277 : 2010(E); "Determination of the specific area of solids by gas adsorption—BET method"; 30 pages; This second edition cancels and replaces the first edition (ISO 9277:1995), which has been technically revised.
Sing, K.S.W. et al.; (1985) "Reporting physisorption data for gas/solid systems with Special Reference to the Determination of Surface Area and Porosity"; Source: Pure & Appl. Chem., vol. 57, No. 4, pp. 603-619.

* cited by examiner

*Primary Examiner* — Matthew Matzek
(74) *Attorney, Agent, or Firm* — Banner & Witcoff, Ltd.

(57) ABSTRACT

The object of the present invention is carbon nanofibers mainly characterized by their high specific volume of mesopores, their high gas adsorption capacity and presenting a graphitic hollow structure. A second object of this invention is a procedure for obtaining such carbon nanofibers, which makes use of a metallic nickel catalyst and specific process furnace parameters that combined with the chemical composition of the furnace atmosphere and the fluidodynamic conditions of the gas stream inside the furnace, result in a faster growth of the carbon nanofibers and also in a higher quality of the carbon nanofibers obtained.

5 Claims, 4 Drawing Sheets

CARBON NANOFIBERS AND PROCEDURE FOR OBTAINING SAID NANOFIBERS

OBJECT OF THE INVENTION

The object of the present invention are carbon nanofibers that present improved physical properties that allow their use in a wide range of applications as well as in fields in which the use of carbon nanofibers obtained by other procedures is less effective.

These carbon nanofibers are defined mainly by macroscopic properties that characterize their performance. The most relevant property is the specific volume of mesopores, which is related to the structural configuration determined by hollow graphitic filament with a large inner diameter and by high gas adsorption capacity.

Other object of this invention is a procedure for obtaining said carbon nanofibers developed in order to make possible the mass production for industrial applications and with properties such as a high specific surface area and a high graphitization degree, obtained without requiring any carbon nanofiber post-treatment. These improved properties prove the high quality of the carbon nanofibers so obtained.

The procedure for obtaining the carbon nanofibers is characterized by the use of a specific metallic catalyst and production parameters that allow establishing binary phase conditions in said catalyst which, combined with the chemical composition of the furnace atmosphere and the fluidodynamic conditions verified inside the production furnace, provide a growth of the carbon nanofibers faster than the corresponding to the standard production processes known for carbon nanofibers, resulting in a higher quality of the carbon nanofibers.

This higher quality of the carbon nanofibers this way obtained is reflected on their surface, where the accumulation of amorphous carbon of pyrolytic origin is negligible, in contrast with other carbon nanofibers of the state of the art. Consequently, the specific surface area is greater, the graphitization degree is higher and the specific volume of mesopores is higher too. It is therefore observed that their gas adsorption capacity due to the mesopores volume is considerably higher than that provided by other carbon nanofibers.

BACKGROUND OF THE INVENTION

Carbon nanofibers are graphitic filament structures formed by their growth from the catalytic decomposition of a hydrocarbon in gaseous phase. This growth is determined by the kinetic and thermodynamic reaction conditions, the composition of the feedstock gas under high temperature conditions, and the nature of the metallic catalyst employed.

The various manufacturing methods for carbon nanofibers can be classified into two main groups, depending on whether the catalyst used is on a fixed substrate or whether it is a floating catalyst. They are also determined by the different reaction conditions and the composition of the working atmosphere, establishing different ranges in the parameters associated to each one.

The production process used to manufacture the carbon nanofibers is crucial from an industrial point of view, since the different conditions valid for obtaining carbon nanofibers in the laboratory may not be feasible from an industrial standpoint due to the limited manufacturing capacity.

In the case of the floating catalyst technique, the reaction takes place in a specific volume without the metallic catalyst particle being deposited on any substrate surface, since it is introduced in the reactor in a continuous manner suspended in the reacting gas flow. The advantage of this technique is that there is no need to later take apart the nanofibers produced from the substrate. In this way, as the supply of reagents to the process furnace and the collection of the product obtained are continuous, the process for producing carbon nanofibers using the floating catalyst technique is directly applicable in industry, unlike carbon nanofiber production processes based on techniques in which the catalyst particles are deposited on a substrate that is subsequently introduced into the process furnace to activate the formation of the carbon nanofibers and eventually removed to collect these carbon nanofibers, separating them from the substrate on which they have been grown.

The carbon nanofibers of the present invention are formed from the metallic catalyst particles suspended in the process furnace gas flow, forming nanometric graphitic fibrillar structures.

The nanofiber graphitic filaments continue growing until the catalyst particles are poisoned or over-saturated with carbon. After the graphitic filament has been grown, a filament thickening process would take place that involves the deposition of pyrolytic carbon on the carbon nanofiber surface, which presents lower structural order than the catalytic graphitic carbon.

Hereinafter said pyrolytic carbon will be identified as amorphous carbon. Amorphous carbon has negative effects on the surface activity of the nanofiber, as will be commented further below, and therefore also has negative effects on its possible applications.

There are studies, such as those by Oberlin [Oberlin A. et al., Journal of Crystal Growth 32, 335 (1976)] that analyze the growth of carbon filaments on metallic catalyst particles by transmission electron microscopy techniques.

Based on these studies, Oberlin proposed a growth model for carbon nanofibers or nanofilaments based on diffusion of carbon about the surface of the catalyst particles until the surface of these particles is saturated or poisoned by excess carbon.

Oberlin also explained that the deposition of amorphous carbon by thermal pyrolytic decomposition is the process responsible for the thickening of graphitic filaments previously grown from the metallic catalyst, and that said pyrolytic process takes place whenever the temperature of the process furnace is high enough and the residence time of the carbon nanofibers in the process furnace is long enough. Therefore, after the catalytic carbon filament growth process has concluded due to the poisoning or the carbon saturation of the catalyst particle, the filament continues to be thickened if it remains exposed to the pyrolysis conditions for an extended period.

The carbon nanofiber thickening process due to the deposition of amorphous carbon of pyrolytic origin is very difficult to avoid, due to the fact that the deposition of pyrolytic amorphous carbon on the carbon nanofiber surface takes place very quickly at production conditions on a floating catalyst system. Thus, only in the case of very low residence time of the gaseous furnace atmosphere, which transports along the furnace the catalyst particles and the carbon nanofibers produced in the process, is possible to avoid the deposition of pyrolytic amorphous carbon on the carbon nanofibers surface, thereby avoiding the loss of quality and properties of the carbon nanofibers resulting in lower graphitization degree, lower specific surface area value and lower specific volume of mesopores.

Considering the structure of the carbon nanofiber graphitic filament of catalytic origin, several configuration models have been identified to describe its graphitic structure based on the different possible growth forms depending on the metallic catalyst particles and the reaction conditions. In some cases the carbon nanofibers are solid and are configured by superimposed graphitic stacked flat plates (known as a platelet structure) and other times their structures are more complex presenting the well known fishbone structure. In the case of not stacked graphitic planes, it is possible to differentiate either a hollow or solid structure composed by the planes in the form of superimposed ribbons along the axis of the carbon nanofibers (known as a ribbon structure). Finally there is other possible structure in the form of stacked truncated cones (stacked cup structure).

The structure of carbon nanofibers is often modelled by one of these configurations, although in most cases it is difficult to precisely determine the actual structure due to the limitations of the inspection and analysis instruments. This is why we refer to "modelling", as it is understood that there is a reasonable fit with one of the aforementioned structures.

FIGS. 3 and 4 are transmission electron microscopy images of a carbon nanofiber according to an embodiment of the invention showing the end of a carbon nanofiber wherein its spiral ribbon is partially unwounded showing a periodically twisted structure. These figures will be used in the detailed description of the invention.

In our case it is not only a model, as the experiments conducted confirm the structure of the nanofiber, as the pictures of FIGS. 3 and 4 clearly show.

There is no doubt that the structure of the carbon nanofibers determines their physical properties at a macroscopic level when used in industrial applications.

For example, structures consisting of disjointed planes would result in a lower electrical conductivity of the filament than in structures which graphitic planes are continuous along the fiber axis providing a high conductivity.

A similar argument applies to the specific surface area of the carbon nanofibers. The free edges of the basal graphitic planes formed during the filament growth are important in all of these carbon nanofiber properties. These free edges increase the specific surface area of the carbon nanofibers and consequently they favour gas adsorption and interaction with other substances to form chemical bonding.

If the external structure of the carbon nanofiber, and more specifically the basal plane free edges, are covered by pyrolytic amorphous carbon then this forms a passivating barrier that hinders the chemical activity of the carbon nanofibers, reducing their capacity to interact with other substances or molecules and reducing the final specific surface area. In this case the fiber will have a poorer quality and fewer applications.

Similarly, a greater presence of pyrolytic amorphous carbon in the carbon nanofibers implies a reduced graphitization degree, which is closely related to their physical properties such as the thermal and electric conductivities; in short, it affects the final quality of the carbon nanofibers and their possible applications.

U.S. Pat. No. 5,024,818 is known, which describes a method for producing carbon nanofibers from carbonaceous compounds. In this patent it is specified that Fe is used as a catalyst. The furnace described in this patent is a floating catalysis process furnace.

Based on the data supplied in the patent, it can be inferred that the furnace operates from 1100° C. to 1150° C. (around 1140° C.), and that it uses a mixture of Fe compounds and S compounds with a molar ratio of 1/1.

Similarly, it can also be inferred that the residence time of the gaseous reagents under the process conditions inside the furnace described in this patent is about 30 s, with a travel velocity of these gases from 0.011 m/s to 0.033 m/s.

The gas stream velocity inside the furnace is important from a production standpoint. This gas stream velocity inside the furnace is directly related to the ratio $[L_0]/[t_0]$, where $[L_0]$ is the characteristic length of the furnace and $[t_0]$ is the characteristic residence time of the gaseous mixture in the furnace.

The production capacity is determined by the $[L_0]$ of the process furnace, by the gas stream velocity and by the residence time $[t_0]$ needed. The larger the $[L_0]$ of the furnace, the higher the gas stream velocity and the shorter the residence time $[t_0]$ are the greater the production capacity of the furnace process is.

The minimum residence time $[t_0]$ needed is determined by the time required for nucleation and growth of the carbon nanofibers. The characteristic furnace length $[L_0]$ is mainly constrained by constructive limitations derived from limited features of the materials currently available for manufacturing such kind of furnaces.

The need for a high $[L_0]$ would lead to a greater size of the furnace that can make its construction unfeasible. Current techniques of making this hind of furnaces do not allow exceeding certain size of the furnace.

These are the main physical limitations, so that it is of interest to act on the residence time $[t_0]$ required for the carbon nanofiber nucleation and growth allowing this way to increase the average circulation velocity inside the furnace and therefore increasing the production capacity of the furnace accordingly.

However the circulation velocity cannot be increased arbitrarily. The aforementioned U.S. Pat. No. 5,024,818 sets a limit for the velocity of the gas stream carrying the Fe catalyst particles to avoid turbulent regimes, as otherwise the fluctuations resulting from the vorticity will prevent a stable growth. This patent establishes for one of the preferred embodiments a circulation velocity of 0.033 m/s.

The object of this patent is to determine the conditions of the reaction process in which the average stream velocity exceeds even by several orders of magnitude those velocities used in U.S. Pat. No. 5,024,818 patent, obtaining accordingly a much higher production capacity and therefore significantly increasing its industrial applicability.

Also the object of this patent is the carbon nanofibers obtained with improved properties, particularly their specific surface area, their graphitization degree and their specific volume of mesopores, thereby improving their gas adsorption capacity, their physical properties and finally their overall quality, allowing a wide industrial applicability.

DESCRIPTION OF THE INVENTION

The carbon nanofibers object of the invention presents a hollow structure with a circular cross-section. It is formed by graphitic planes arranged in the form of spirally superimposed ribbons along the axis of the carbon nanofibers thereby ensuring its continuity, so that among its noteworthy properties are its high electric and thermal conductivities. This structure will be shown in the drawings and the electron microscopy pictures of the detailed description of the invention.

The carbon nanofiber surface presents two families of free edges able to form bonds with other substances: those facing the outside of the nanofiber and those facing the inner cylindrical channel of the carbon nanofiber.

Although most the carbon nanofibers obtained by the manufacturing process of the invention present a structure corresponding to a spirally superimposed ribbon model, it is noted that other kind of structures are also present as a smaller part of the final product, such as platelet carbon nanofibers or carbon nanotubes.

The presence of pyrolytic amorphous carbon on the outer surface of the carbon nanofibers covering at least part of the aforementioned graphitic ribbons free edges, thereinafter the free plane edges, reduces the capacity of the carbon nanofibers to interact with other chemical compounds. Therefore, one of the advantages of the carbon nanofibers of the invention is a greater specific surface area due to the absence of pyrolytic amorphous carbon using the procedure of the invention.

The most important of scattering techniques has been used as a dominant tool to study the defect structure of all types of carbon fibers and filaments. Many carbons have disorder between that of the two extreme theoretical situations, single crystal graphite and turbostratic carbon. This disorder is usually known as turbostratic disorder and it has an inverse linear relationship with the graphitization degree.

Several attempts have been made to quantify the graphitization degree. The simplest approach is to use an empirical graphitization index $G_p$, which depends linearly on the interplanar separation $d_{002}$, which is obtained from the (002) reflection of the X-ray diffraction test [Maire, J. and Mering, J., 1958, *Proc. First Conference of the Society of Chemical Ind. Conf. on Carbon and Graphite* (*London*), 204] using the relation between $d_{002}$ and $G_p$:

$$G_p = [(0.344 - d_{002})/(0.344 - 0.3354)] \cdot 100$$

Regarding the free plane edges facing the inner channel of the carbon nanofiber, these can have a greater or lesser capacity to adsorb gaseous substances.

The first object of the invention is a carbon nanofiber with gas adsorption capacity substantially higher than that observed in the prior art.

The free plane edges facing the carbon nanofiber inner channel contribute to the gas adsorption capacity. The pyrolytic amorphous carbon does not contribute to the formation of graphitic planes. Therefore a greater proportion of said amorphous carbon reduces the number of active plane free edges formed per unit mass and consequently the gas adsorption capacity of the product obtained.

The carbon nanofibers gas adsorption is mainly determined by the capacity to retain gaseous atoms, ions or molecules depending mainly on the chemical affinity of the graphitic plane free edges to them, both on the inner and outer surfaces of the carbon nanofiber. This gas adsorption is enhanced in the inner surface of the carbon nanofiber due to the capillarity effects resulting from the dimensions of the inner channel diameter. For this reason, the inner plane free edges contribute more to the gas adsorption capacity of the carbon nanofibers than the outer ones.

The inner diameter of the hollow channel of the carbon nanofibers object of the invention is in the range from 2 nm to 50 nm. This range corresponds to a specific kind of pores referred as mesopores by the IUPAC (The International Union of Pure and Applied Chemistry). Thus, it can be said that the resulting gas adsorption capacity of the carbon nanofibers is mainly due to the presence of mesopores in their structure.

This fact is corroborated by the $N_2$ adsorption-desorption test at 77K of the carbon nanofibers without any activation treatment. The corresponding $N_2$ adsorption-desorption isotherms obtained show an hysteresys cycle curve which lower limit corresponds to relative pressure values $P/P_0$ (where $P_0$ is the $N_2$ saturation pressure) at about 0.4 and always under 0.65, corresponding the $P/P_0$ range covered by this hysteresys cycle to the effect of the presence of mesopores. The corresponding specific mesopore volume of the carbon nanofibers is significantly higher than that found in the carbon nanofibers known in the prior art.

The gas adsorption capacity of the carbon nanofiber surface depends on the presence of mesopores and the total specific volume of mesopores.

A second aspect of the present invention consists of a procedure for obtaining carbon nanofibers from a enriched carbon gas stream and a floating metallic catalyst, with a high production capacity due to a high circulation velocity of the gas stream in the carbon nanofiber production furnace, as well as improved properties of the carbon nanofibers obtained with this process.

The manufacturing procedure involves the use of a process furnace for generating carbon nanofibers from a gas mixture stream that circulates through it, with floating metallic catalyst particles, causing the nucleation and subsequent growth of carbon nanofibers.

The main factor allowing a high nucleation rate and fast growth of the carbon nanofibers is the use of a suitable combination of metallic catalytic particles and a gas stream with specific properties.

This invention uses nickel metal particles which, at the process furnace temperature, combined with the sulfur present in the furnace gaseous atmosphere to attain at these conditions a binary phase in the catalyst particle, a solid Ni phase and a liquid NiS phase.

In these conditions at the process furnace temperature the catalytic particle undergoes a partial fusion so that the particle made up of two phases, differentiating in the catalytic particle a Ni core that remains solid throughout the entire process and a NiS part due to the presence of sulfur in the gases involved in the process that at the process temperature will fuse due to the melting point of NiS is lower that the working temperature, and thus can flow around the solid Ni core.

As alternative it is also possible to supply to the process furnace sulfur used to generate the catalytic particle as a component of a chemical compound added to the gas process stream.

The liquid NiS phase allows the deformation of the catalytic particle when it is carried by the gas stream, adopting an elongated or teardrop shape in the reaction conditions allowing a faster carbon nanofiber nucleation and growth.

The addition of the catalytic particles to the gas process stream in the furnace when the gas stream velocity is high enough can generate its lengthening due to the deformation of the NiS liquid phase of each of them attaining optimal carbon nanofiber growing conditions.

There are two main reasons because the presence of a combination of Ni and S is necessary: firstly, because nickel has been proved to be more active than iron in carbon nanofibers nucleation and growth; secondly, because the NiS physical properties allow it to melt at the process temperature.

The combined use of a mixture of Ni and NiS as a catalyst is the main reason for the enhanced production of carbon nanofibers at a higher productivity and with better carbon nanofiber quality, this is, with a high specific surface area and graphitization degree.

This higher carbon nanofiber nucleation and growth rates allow the use of higher gas stream process velocities that can even be in the turbulent regime without harming the final quality of the carbon nanofibers so obtained.

The formation of amorphous carbon of pyrolytic origin is favoured by longer residence times in the process furnace at the working temperature. Part of the improved quality of the carbon nanofibers obtained by the procedure of the invention is due to the shorter residence time needed for the carbon nanofiber nucleation and growth and consequently the formation and deposition of amorphous carbon of pyrolytic origin on the outer surface of the nanofiber is considerably reduced.

It can be established that the essential elements of the second aspect of the invention a procedure for obtaining carbon nanofibers in a furnace from the catalytic decomposition of a hydrocarbon in vapour phase using a floating catalyst, by the growth of the graphitic filament, wherein:

The catalytic particle comprises two phases, a first solid phase of metallic nickel and a second phase of a nickel sulfide compound in liquid state during the growth of the graphitic filament; and The catalytic particle is carried by the gas stream inside the process furnace.

DESCRIPTION OF THE FIGURES

The present descriptive report is completed by a set of figures that illustrate a preferred example and in no way limit the invention.

DETAILED DESCRIPTION OF THE INVENTION

To characterize the carbon nanofibers according to the first aspect of the invention, laboratory experiments have been carried out that show their main properties. The carbon nanofibers obtained by the procedure of the same invention present improved physical properties that allow their use in a wide range of applications as well as in fields in which the use of carbon nanofibers obtained by known procedures of the prior art is less effective.

Due to the wide range of values of the characteristics of the carbon nanofibers obtained from the floating catalyst process, the properties of the carbon nanofibers obtained must be statistically studied. The characteristics of any single graphitic filament do not represent the global properties of the material. Therefore, to evaluate the carbon nanofibers properties it is necessary the use of characterization techniques applied to samples large enough to be representative of the material. For this reason, the characterization of the carbon nanofibers of the invention is mainly based on the measure of their specific properties as the specific surface area, the specific mesopore volume and the graphitization degree.

In the case of the specific mesopores volume, it is determined from the isotherms resulting of the $N_2$ adsorption-desorption experiment.

In this experiment, due to the differences between the $N_2$ adsorption and desorption processes resulting from the presence of mesopores in the carbon nanofibers, two different isotherm curves are recorded, a first isotherm corresponding to the $N_2$ adsorption process and a second one corresponding to the $N_2$ desorption process, both determining an hysteresys cycle, being the surface enclosed in the hysteresys curve directly proportional to the specific volume of mesopores.

The measurement method subjects a sufficiently representative amount of carbon nanofibers to a constant temperature in a controlled atmosphere composed of the gas to be adsorbed and desorbed, which in this case are a temperature of 77K and pure $N_2$ the gas to be used.

This pure $N_2$ atmosphere is subjected to a rising-decreasing pressure cycle at isothermal conditions, consequently inducing a $N_2$ adsorption-desorption process in the carbon nanofibers sample. The test conditions to carry out the experiment are defined by standard DIN 66131:1993 which is considered for both, the rising and the decreasing pressure cycles. The experiment has been carried out according to the IUPAC (Pure & Appl. Chem., Vol 57, No, 4, pp 603-619, 1985) recommendations in order to quantify the porosity and the specific surface area. In particular, standard DIN 66131:1993 has been used to evaluate the specific surface area.

Figure 1:
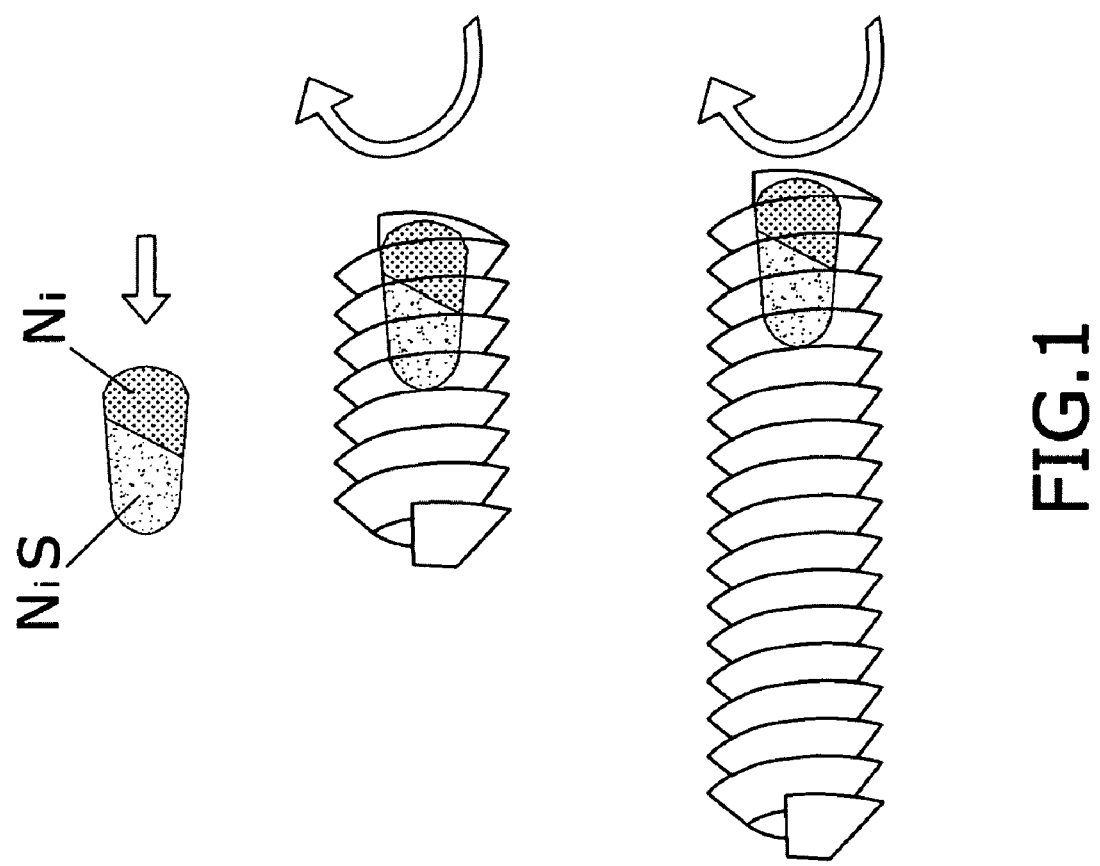
FIG. 1 shows the model describing the structure of a carbon nanofiber in various growth stages. There is a first stage when the catalytic particle is composed of two phases, a solid nickel phase and a molten nickel sulfide phase. A second stage is shown where the formation of the spirally superimposed ribbons along the axis of the carbon nanofibers due to the desorption of carbon supplied by the gas stream is represented by the thick arrows. The third stage shown corresponds to the further growing of the graphitic filament.
Figure 2:
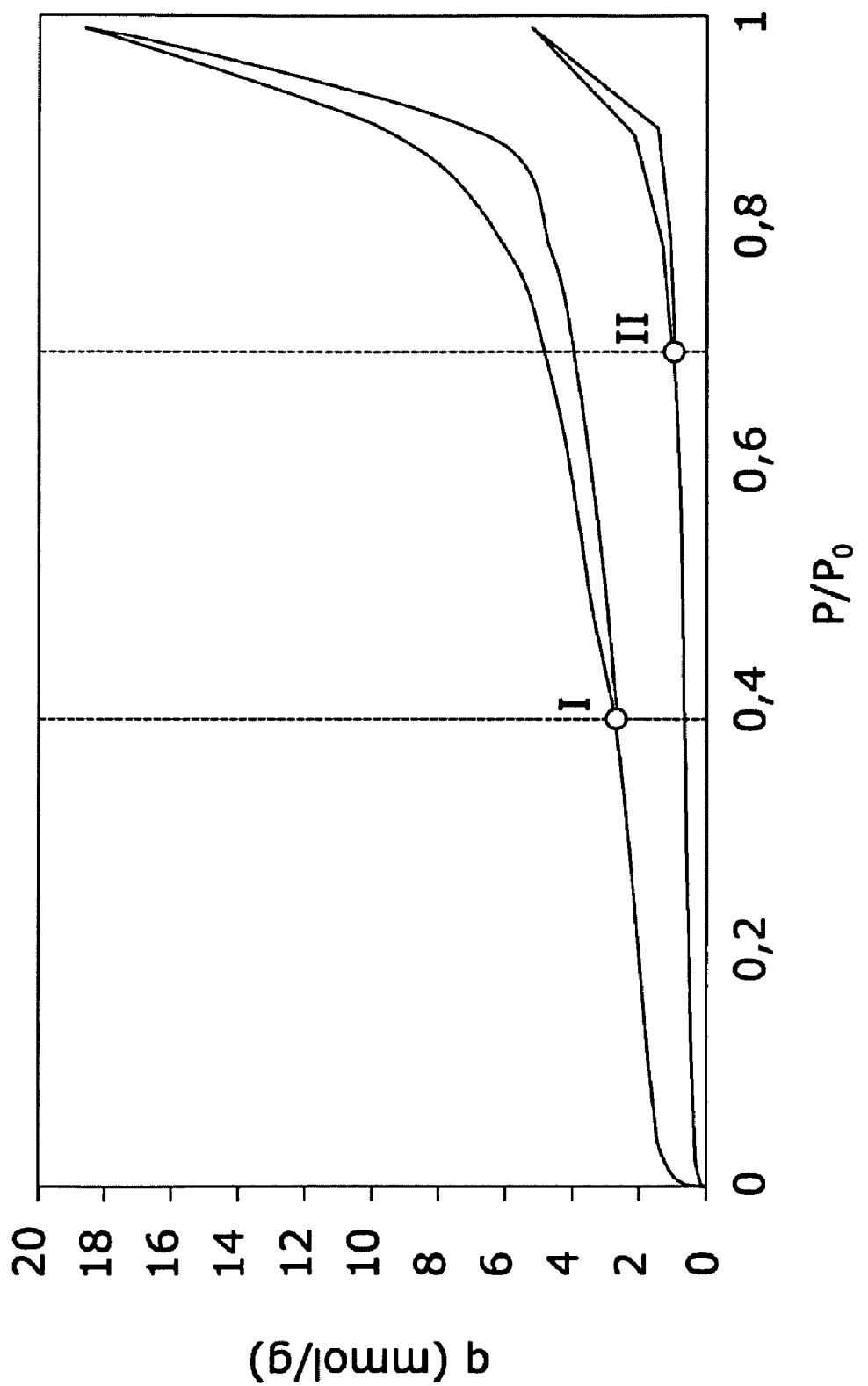
FIG. 2 shows a graph comparing the two $N_2$ adsorption-desorption isotherms corresponding to two samples of carbon nanofibers, a first sample corresponding to the carbon nanofibers object of this invention and a second sample corresponding to the prior art carbon nanofibers cited in the present description. The lower end of the hysteresis cycle within the isotherm corresponding to the carbon nanofibers of the invention is labelled as (I); the lower end of the hysteresis curve cycle within the isotherm corresponding to the cited prior art carbon nanofibers is labelled as (II).

The $N_2$ adsorption-desorption isotherms form a closed hysteresys cycle which enclosed area is proportional to the specific volume of mesopores. These curves are represented in FIG. 2 obtained from two samples, one of them corresponding to the sample of carbon nanofibers of the invention and the other sample corresponding to the carbon nanofibers of the prior art.

It is highly relevant to determine the point at which the relative pressure $P/P_0$ of $N_2$ adsorption and desorption isotherms begin to diverge. The lower this point, the larger the area enclosed by the hysteresys cycle and consequently the greater the adsorption capacity. This way it is possible to determine values for the $P/P_0$ lower hysteresys cycle point under 0.65 characterizing the carbon nanofibers of the present invention. Moreover, the carbon nanofibers obtained according to the procedure of this invention can even reach values for the $P/P_0$ lower hysteresys cycle point of about 0.4.

Applying this experimental technique to both, the carbon nanofibers of the present invention and to the carbon nanofibers obtained according to the procedure described in U.S. Pat. No. 5,024,818, the following specific mesopore volume values are obtained:

0.18 $cm^3/g$ for the carbon nanofibers obtained according to the present invention:

0.04 $cm^3/g$ the carbon nanofibers obtained according to the procedure described in U.S. Pat. No. 5,846,509:

Therefore, the difference of the specific volume of mesopores of the two carbon nanofibers can be even as large as 450%.

The lowest value found for the specific volume of mesopores for the carbon nanofibers object of the invention is 0.08 $cm^3/g$. All measurements correspond to 77K isothermal conditions and without any surface activation treatment of the carbon nanofibers surface that may modify the surface activity of the graphitic filament.

FIG. 2 shows the $N_2$ adsorption-desorption isotherms. The largest hysteresys cycle corresponds to the carbon nanofibers of the present invention and the smaller one corresponds to those carbon nanofibers obtained by the procedure described in U.S. Pat. No. 5,846,509.

The specific surface area and graphitization degree have been also measured obtaining higher values of both properties for the carbon nanofibers of the present invention than for the carbon nanofibers produced by the procedure described in U.S. Pat. No. 5,846,509 of the prior art.

Regarding the values measured for the carbon nanofibers of the present invention, the specific surface area was found to be always higher than 100 m$^2$/g, whereas the carbon nanofibers of the prior art does not exceed a specific surface area of 50 m$^2$/g. More specifically the carbon nanofibers of the present invention present specific surface area values from 130 to 200 m$^2$/g.

Regarding the graphitization degree, quantified by the graphitization index, the values obtained for the carbon nanofibers of the present invention was found to be above 40%, whereas the carbon nanofibers described in U.S. Pat. No. 5,846,509 present values between 30% to 40%. More specifically the carbon nanofibers of the present invention present graphitization index values from 50% to 75%.

The carbon nanofibers structure of the present invention is a graphitic filament being essentially cylindrical and hollow, identifying by transmission electron microscopy that its longitudinal cross section shows graphitic planes oblique to the longitudinal axis of the filament.

Figure 3:
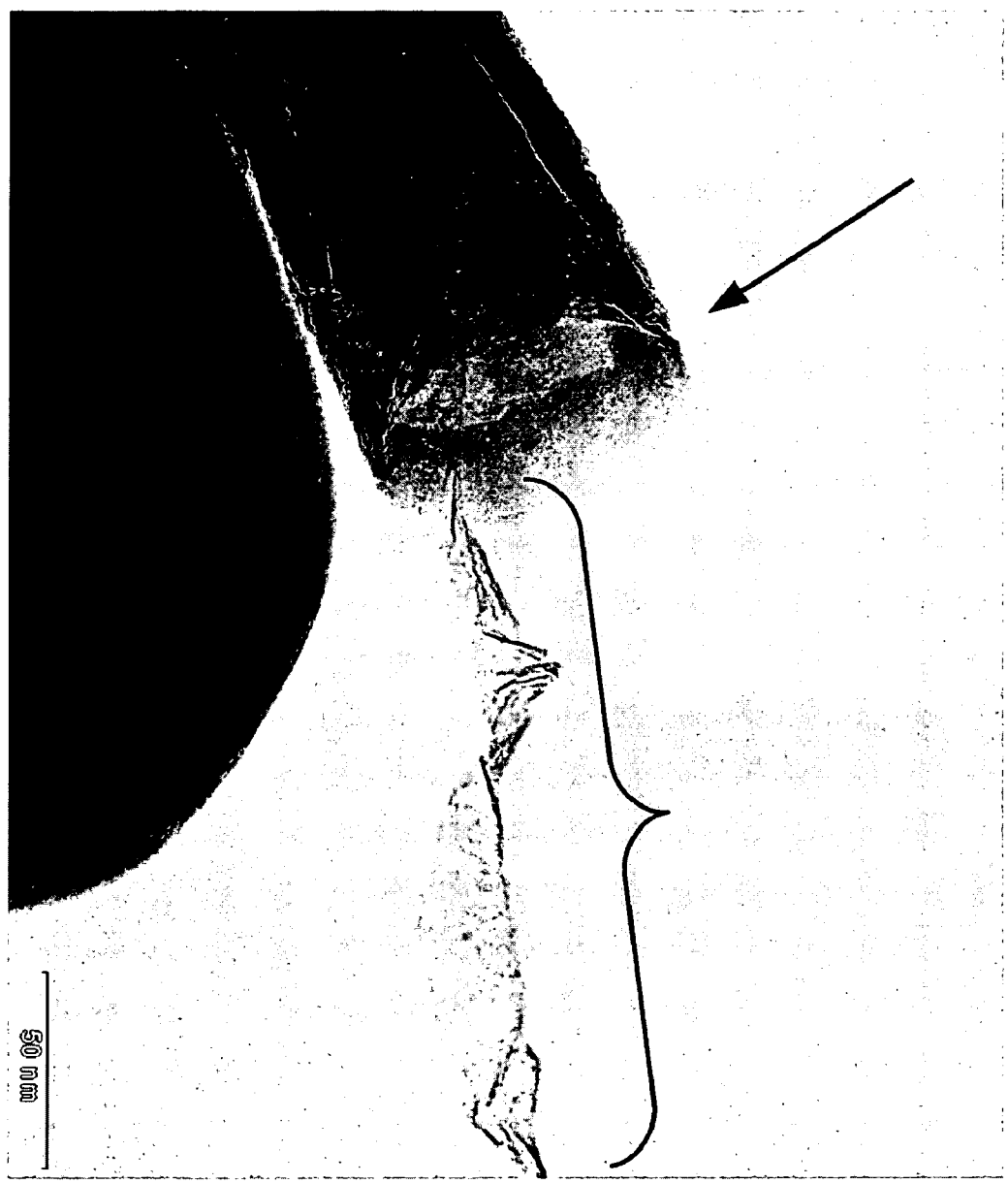
FIGS. 3 and 4 are transmission electron microscopy images of a carbon nanofiber according to an embodiment of the invention showing the end of a carbon nanofiber wherein the spiral ribbon is partially unwounded showing a periodically twisted structure.
Figure 4:
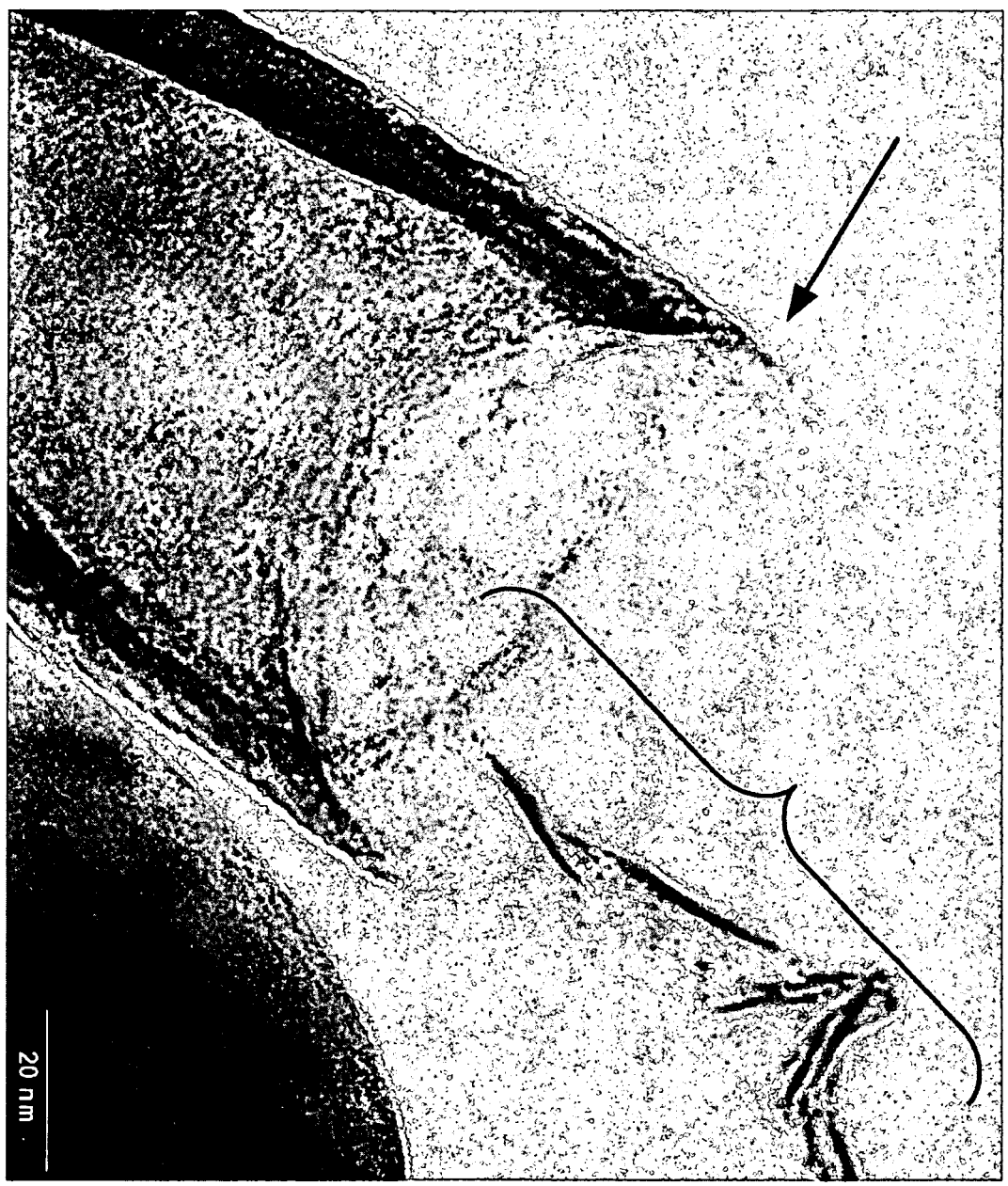

These oblique planes observed in the cross section correspond to the basal graphitic planes that constitute the helical superimposed ribbon structure of the carbon nanofibers in which said planes are therefore connected to each other along the axis of the carbon filament as shown in FIGS. 3 and 4.

Since the negligible formation of amorphous pyrolytic carbon cannot cover the graphitic carbon filament in its greater part, the edges of the basal graphitic planes are not covered by amorphous pyrolytic carbon and therefore the resulting surface of the carbon nanofibers of the present invention keeps a high chemical activity. That is why the carbon nanofibers of the present invention present a specific surface area and graphitization degree much higher than those observed for carbon nanofibers of the prior art.

Other factor that can contribute to a higher specific volume of mesopores of the carbon nanofibers is the falling off of the catalytic particles from the carbon nanofibers, leaving the end of the nanofiber open allowing the access of gaseous atoms, molecules or ions inside the hollow core of the graphitic filament. However, carbon nanofibers with the catalytic particles attached to their ends are also considered to be part of the invention.

The process for obtaining the carbon nanofibers of the invention uses a sulfur supply in the gas stream introduced into the furnace, being the furnace temperature between 900° C. and 1250° C., being the preferred temperature range from 1100° C. to 1200° C.

The sulfur-nickel molar ratio used must be in the range 0.5 to 5, being preferred the range from 1.2 to 3. In these ranges and at the specified furnace temperature the catalytic particles present a binary phase composed of a solid metallic nickel phase and a molten nickel sulfide phase.

To prevent the formation of amorphous carbon of pyrolytic origin that could deteriorate the properties of the carbon nanofibers obtained by the process of the present invention the gas stream velocity inside the furnace must be between 0.1 m/s and 12 m/s, and preferably between 0.2 m/s to 1.5 m/s.

These circulation velocity ranges ensure a residence time of the carbon nanofibers produced in the furnace that is in the range from 1 s to 15 s, and preferably from 2 to 8 s.

The FIGS. 3 and 4 correspond to different transmission electron micrographs of the end of different carbon nanofibers obtained according to the process of the present invention where a partially unwound detached end of the helical superimposed graphitic ribbon planes of the carbon nanofiber is shown.

The end and the detached part of the carbon nanofiber are indicated in the figures. The micrographs show the helical superimposed graphitic ribbon planes of the hollow structure of the carbon nanofiber apparently similar to but different from a cup-stacked graphitic structure.

According to this micrographs, the ribbon is cyclically stacked following a continuous helical generatrix being constituted by one or more than one graphitic planes. In some views looking at the point where the detached part of the ribbon narrows it is also possible to observe the presence of one or several graphitic planes.

The invention claimed is:

1. Carbon nanofibers comprising graphitic filaments having a hollow structure constituted by graphitic basal planes in the form of superimposed helical ribbon or ribbons wound along the carbon nanofiber axis, wherein the carbon nanofibers exhibit hysteresis behavior in the $N_2$ adsorption-desorption isotherm test at 77K without any previous surface activation treatment of said carbon nanofibers and the hysteresis starting point value is lower than 0.65 of the $N_2$ $P/P_0$ relative pressure, where $P_0$ is the $N_2$ saturation pressure;

wherein the test conditions to carry out the hysteresis experiment are defined by the DIN 66131:1993 standard;

wherein the carbon nanofibers have a graphitization index $G_p$ higher than 40% and is calculated from $d_{002}$ obtained from the (002) reflection in the X-ray diffraction test and its relation with the $G_p:G_p=[(0.344-d_{002})/(0.344-0.3354)]\cdot 100$;

a specific volume of mesopores greater than 0.08 cm$^3$/g obtained from the area enclosed by the hysteresis cycle curve of the $N_2$ adsorption-desorption isotherm test at 77K; and a specific surface area is in the range from 130 to 200 m$^2$/g.

2. Carbon nanofibers according to claim 1 wherein the graphitization index $G_p$ is in the range from 50% to 75%.

3. Carbon nanofibers according to claim 2 wherein the graphitic filaments comprise a catalytic particle attached to one of their ends.

4. Carbon nanofibers according to claim 1 wherein at least one ribbon comprises several graphitic basal planes.

5. Carbon nanofibers according to claim 1 wherein at least one ribbon comprises a sole graphitic basal plane.

* * * * *